United States Patent [19]
Stürtz

[11] Patent Number: 6,086,703
[45] Date of Patent: Jul. 11, 2000

[54] METHOD AND APPARATUS FOR MANUFACTURING WINDOW FRAMES FROM PLASTIC SECTIONS

[75] Inventor: Karl-Heinz Stürtz, Neustadt, Germany

[73] Assignee: Willi Stürtz Maschinenbau GmbH, Neustadt, Germany

[21] Appl. No.: 09/062,856

[22] Filed: Apr. 20, 1998

[30] Foreign Application Priority Data

Apr. 23, 1997 [DE] Germany ............................ 197 16 993
Aug. 7, 1997 [DE] Germany ............................ 197 34 194

[51] Int. Cl.⁷ .................................................. B29C 65/20
[52] U.S. Cl. .................. 156/267; 156/304.2; 156/304.6; 156/309.9; 156/499; 156/580
[58] Field of Search ................................ 156/267, 304.1, 156/304.2, 304.6, 308.2, 309.9, 322, 499, 580, 583.1

[56] References Cited

U.S. PATENT DOCUMENTS

| | | | |
|---|---|---|---|
| 4,752,350 | 6/1988 | Schuster | 156/379.6 |
| 4,909,892 | 3/1990 | Quinn et al. | 156/499 |
| 4,963,219 | 10/1990 | Nichols et al. | 156/304.2 |
| 4,995,935 | 2/1991 | Ganzberger | 156/499 |
| 5,439,546 | 8/1995 | Brickenstein | 156/304.2 |
| 5,660,670 | 8/1997 | Sturtz | 156/304.2 |
| 5,736,000 | 4/1998 | Sturtz | 156/499 |

*Primary Examiner*—James Sells
*Attorney, Agent, or Firm*—Friedrich Kueffner

[57] ABSTRACT

A method and an apparatus for manufacturing window frames from plastic sections, wherein the plastic sections for always two window frames to be welded at a distance one above the other are placed in the double welding heads of a horizontal four-head welding machine, and wherein the double welding heads are arranged in pairs on a displaceable carriage so as to be shiftable relative to each other. The plastic sections are then clamped in the welding machine and are welded. After at least partial cooling, the welded window frames are released and removed. At least two support elements arranged at a short distance from one carriage and directed toward the other carriage are moved from two opposite sides underneath two welded window frames. At least after the double welding heads of the one carriage have been moved apart, both welded window frames are moved simultaneously and partially resting on the support elements laterally out of the four-head welding machine and are transferred to an intermediate station by a travel movement of the other carriage.

17 Claims, 2 Drawing Sheets

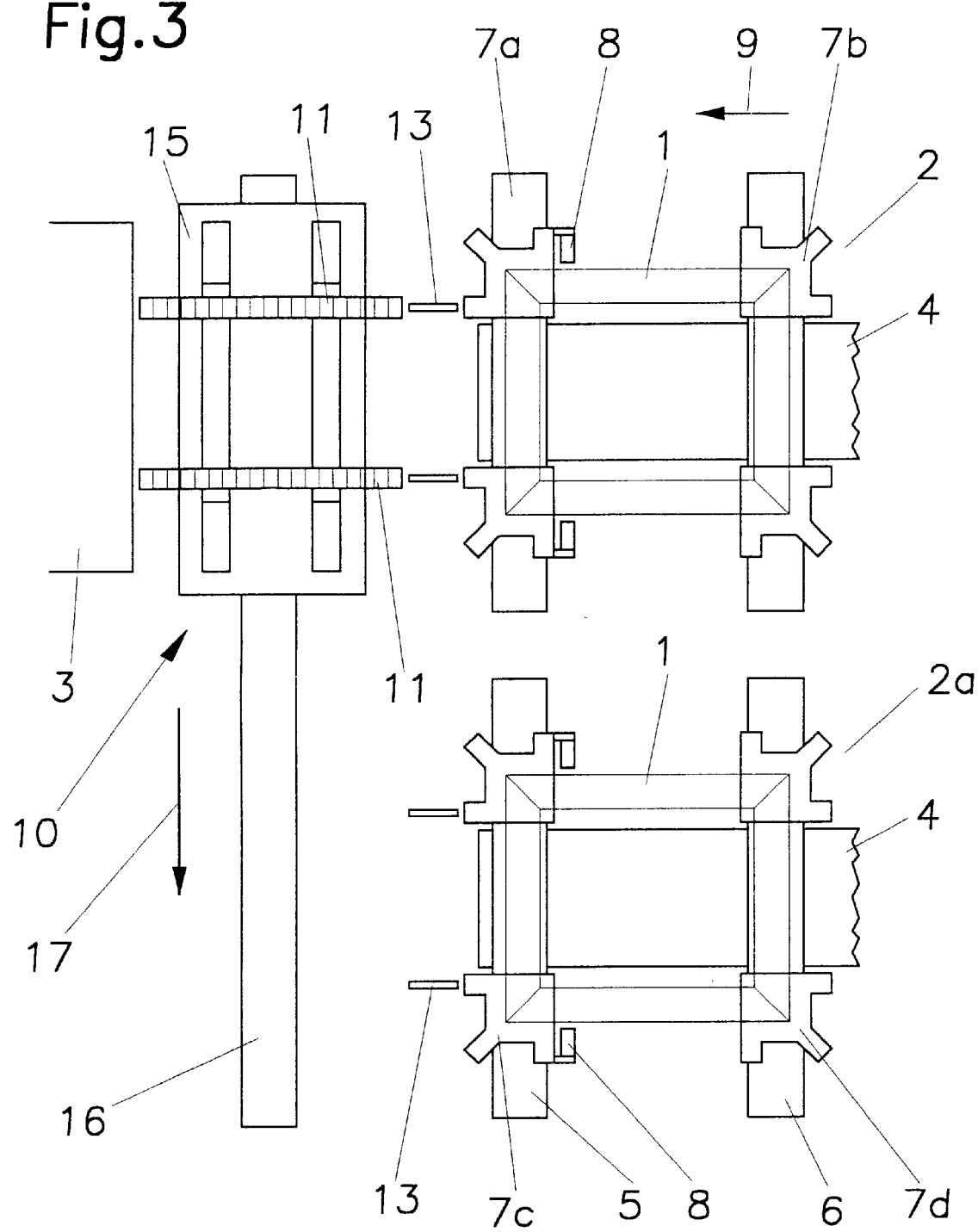

METHOD AND APPARATUS FOR MANUFACTURING WINDOW FRAMES FROM PLASTIC SECTIONS

BACKGROUND OF THE INVENTION

1. Field of the Invention

The present invention relates to a method of manufacturing window frames from plastic sections. The plastic sections for always two window frames to be welded at a distance one above the other are placed in the double welding heads of a horizontal four-head welding machine, wherein the double welding heads are arranged in pairs on a displaceable carriage so as to be shiftable relative to each other. The plastic sections are then clamped in the welding machine and are welded. After at least partial cooling, the welded window frames are released and removed.

The present invention also relates to an apparatus for carrying out the above-described method.

2. Description of the Related Art

For manufacturing window frames of plastic sections, welding machines are used which are constructed as four-head welding machines and assume, for example, a horizontal position. The individual sections are placed from above into a horizontally operating four-head welding machine, are clamped in the machine and are welded together under pressure and heat. After welding, the frame is removed upwardly, for example, by hand, and is transferred to a horizontal transport device which conveys the frame to a welding bead cleaning or trimming machine.

However, it is also known in the art to push the welded frame released from the clamping devices of the four-head welding machine in its horizontal position out of the four-head welding machine. The frames can be pushed out either by means of a special pushing device or by two welding heads. Also in this case, the welded frames are conveyed by a transport device to the welding bead cleaning or trimming machine in which the individual corners of the welded frames are freed from the welding beads.

In a plant for manufacturing frames of plastic material, which may be casements as well as door and window frames, wherein the plant is comprised of horizontal four-head welding machine and a horizontal welding bead cleaning or trimming machine, the output of the plant is dependant on the slowest unit, i.e., the four-head welding machine because heating of the plastic sections for the welding procedure and cooling of the welding seams takes a relatively long time. This means that the capacity of the welding bead cleaning or trimming machine cannot be fully utilized.

In order to increase the output of such a manufacturing plant, it is known in the art to construct the individual welding heads of the four-head welding machine in the form of so-called double welding heads. In such a four-head welding machine with double welding heads, the individual sections for two window frames are successively placed in the machine and are simultaneously welded together to form window frames. However, the removal of the finished welded window frames takes place manually in this type of four-head welding machine because the lower frame can only be released for removal and taken out once the upper window frame is no longer in the four-head welding machine. Also in this case, the removed window frames are transferred to a transport device which conveys the frames to a subsequently arranged welding bead cleaning or trimming machine. By removing the finished welded window frames manually, the actual capacity of a four-head welding machine with double welding heads is not utilized in an optimum manner, so that the capacity of such a manufacturing plant is relatively low.

SUMMARY OF THE INVENTION

Therefore, it is the primary object of the present invention to propose a method of manufacturing window frames of plastic sections in which the output of a manufacturing plant composed of a welding bead cleaning or trimming machine and a four-head welding machine with double welding heads is significantly increased and, thus, the capacity of a modern welding bead cleaning or trimming machine can be fully utilized.

In accordance with the present invention, in a method of the above-described type, at least two support elements arranged at a short distance from one carriage and directed toward the other carriage are moved from two opposite sides underneath two welded window frames. At least after the double welding heads of the one carriage have been moved apart, both welded window frames are moved simultaneously and partially resting on the support elements laterally out of the four-head welding machine and are transferred to an intermediate station by a travel movement of the other carriage.

The method according to the present invention makes it possible to move the two finished welded window frames in a relatively short time out of the four-head welding machine, so that the welding machine is then once again very quickly ready for receiving plastic sections for new window frames. This results in a significant increase of the capacity of a manufacturing plant for window frames of plastic sections.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 3 is a top view of another embodiment of an apparatus for carrying out the method according to the present invention.

DESCRIPTION OF THE PREFERRED EMBODIMENTS

Figure 1:
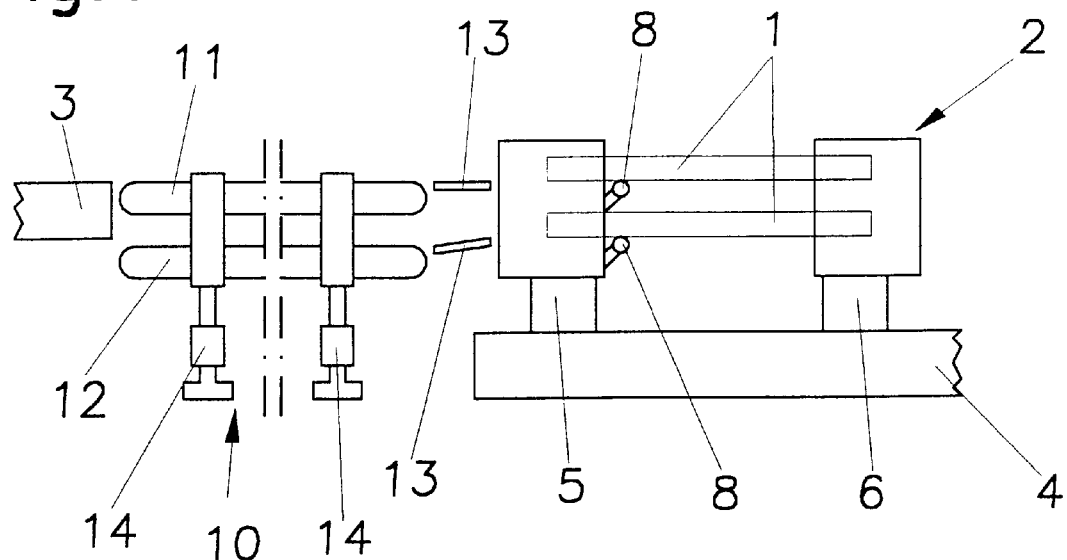
FIG. 1 is a schematic side view of an apparatus for carrying out the method according to the present invention.
Figure 2:
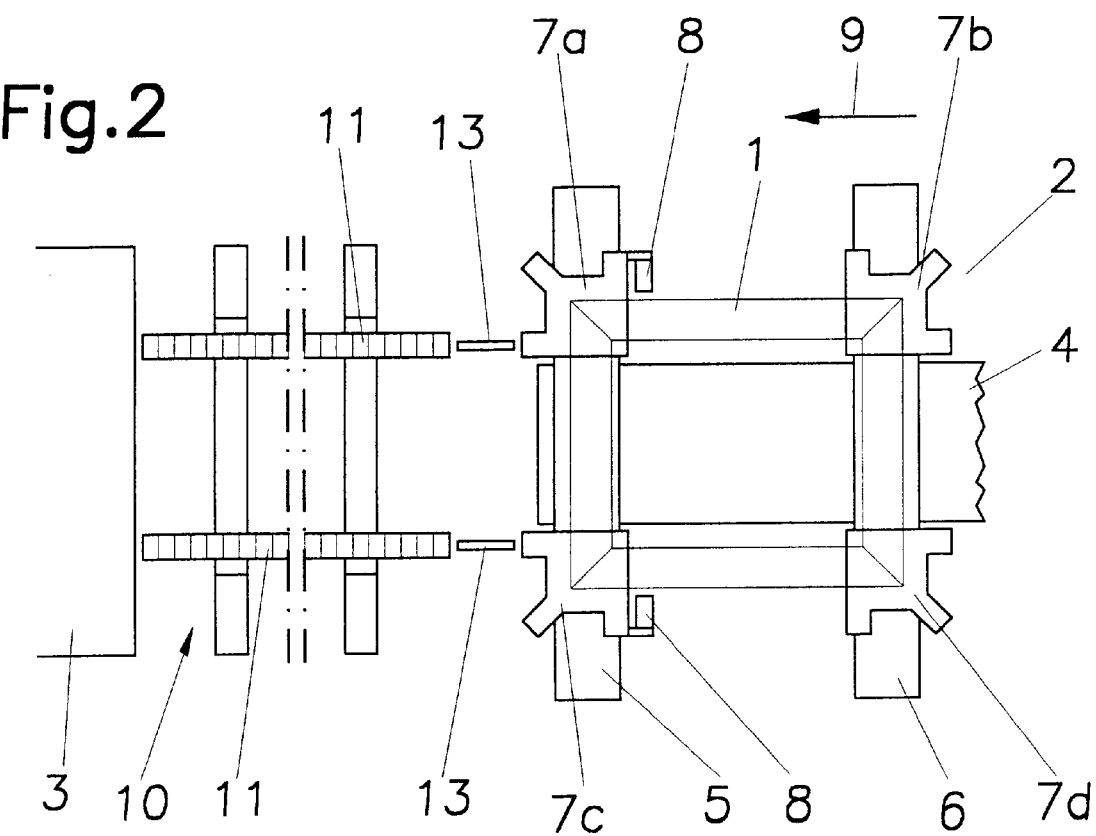
FIG. 2 is a top view of the apparatus of FIG. 1.

Of a production line for manufacturing window frames 1 of plastic sections, FIGS. 1 and 2 of the drawing merely show a four-head welding machine 2, while only portions of a work table 3 of a subsequently arranged welding bead cleaning or trimming machine are illustrated.

The frames may be casements as well as window or door frames.

The four-head welding machine 2 is composed of a stationary frame 4 mounted on the ground. The frame 4 is constructed on its upper side as a guide means and receives on the guide means two movable carriages 5, 6. Each carriage 5, 6 is on its upper side also provided with conventional guides which are not illustrated for clarity's sake.

Always two conventional welding heads 7a to 7d are arranged so as to be displaceable relative to each other on the guides of the carriages. The carriages 5, 6 as well as the welding heads 7a to 7d are provided with conventional displacement drives, also not illustrated. This configuration makes it possible to manufacture window frames 1 of different sizes, wherein the welding heads 7a to 7d can be adjusted in accordance with the size of the window frames 1 to be manufactured.

The welding heads 7a to 7d are constructed as so-called double welding heads. This means that two sections for two window frames 1 can be placed, clamped and welded in the four welding heads 7a to 7d. For this purpose, the plastic sections cut to the required length are heated at the miter surfaces facing each other and are pressed together under pressure. This causes the sections of plastic material to be welded together. After welding and at least partial cooling of the welded areas, the two window frames 1 are released from the welding heads 7a to 7d. Subsequently, support elements 8 are moved at two opposite sides underneath each window frame 1. In the illustrated embodiment, the support elements 8 are provided at the welding heads 7a, 7c. If necessary, the support elements 8 can also be provided on the carriage 5.

These support elements 8, which may be constructed as guide rails, rollers, or brush-type rails, support the finished welded window frames when the welding heads 7a, 7c are moved outwardly and release the window frames 1. The window frames 1 now rest on one side on the support elements 8 and on the other side on the welding heads 7b, 7d. If necessary, it is also possible to move the welding heads 7b, 7d apart to such an extent that they also release the window frames 1. However, this makes it necessary to provide support elements 8 also in the area of the welding heads 7b, 7d or in the area of the carriage 6.

As soon as at least the welding heads 7a, 7c have released the window frames 1, the carriage 6 is moved on the frame 4 in the direction of arrow 9. This causes the window frames 1 to be moved at least partially out of the welding machine 2. An intermediate station 10 is arranged between the welding machine 2 and the work table 3 of the welding bead cleaning or trimming machine, not shown. In the illustrated embodiment, the intermediate station 10 is composed of two conveyor belts 11, 12 arranged in different planes, wherein the conveyor belts 11, 12 are arranged so as to be able to receive the window frames 1 which have been moved laterally out of the welding machine 2. The distance between the conveyor belts 11, 12 is preadjusted in accordance with the width of the window frames 1. The distance between the conveyor belts 11, 12 is adjustable. As soon as the window frames 1 are for the most part moved onto the conveyor belts 11, 12, the remaining transportation of the window frames 1 out of the welding machine is carried out by the conveyor belts 11, 12. Once the window frames 1 are moved out of the welding machine 2, the welding heads 7a to 7d can again be moved back into their initial positions for receiving plastic sections for producing additional window frames 1.

The intermediate station 10 is adjusted, for example, in such a way that window frames placed on the conveyor belts 11 can be transferred immediately to the work table 3 of the welding bead cleaning or trimming machine. After this has been carried out, the conveyor belts 11, 12 of the intermediate station 10 are raised by means of lifting devices 14, only schematically shown, until the window frame 1 placed on the conveyor belts 12 can also be transferred to the work table 3 of the welding bead cleaning or trimming machine.

If necessary, guide rails 13 can be provided between the welding machine 2 and the intermediate station 10 constructed as a lifting table. The guide rails 13, only schematically indicated, may be constructed as short conveyor belts. The guide rails 13 ensure a problem-free transfer of window frames 1 from the welding machine 2 to the intermediate station 10.

The guide rails 13 are arranged, for example, on the welding heads 7a, 7c or on the carriage 5. However, it must always be ensured that the guide rails 13 can be adjusted in accordance with the width of the window frames 11. It is possible to provide special push members at the welding heads 7b, 7d or on the carriage 10 for transferring the pushing movement of the carriage to the window frames 1.

In the embodiment illustrated in FIG. 3, an additional four-head welding machine 2a is provided at a distance from the four-head welding machine 2 provided with the double welding heads 7a to 7d. Both four-head welding machines 2 and 2a are constructed in the same way. The finished window frames 1 pushed out of the fourhead welding machine 2a are also received by the intermediate station 10 and transferred to the work table 3 of the welding bead cleaning or trimming machine. For this purpose, the conveyor belts 11, 12 and the lifting devices 14 are arranged on a table 15 which can be moved on a guide member 16 by a conventional drive in the direction of arrow 17 and back. The guide member 16 is arranged laterally of both four-head welding machines 2, 2b and between the welding machines and the work table 3 of the welding bead cleaning or trimming machine, not shown. This configuration further increases the output of a production line for manufacturing window frames of plastic material.

In accordance with a modification or further development of the embodiment shown in FIG. 3, it is also possible to arrange three four-head welding machines 2, 2a next to each other, wherein a common intermediate station 10 is also provided for the three welding machines. In that case, if necessary, the guide member 16 may be provided with two tables 15.

While specific embodiments of the invention have been shown and described in detail to illustrate the inventive principles, it will be understood that the invention may be embodied otherwise without departing from such principles.

I claim:

1. A method of manufacturing window frames from sections of plastic material, the method comprising placing plastic sections for manufacturing two window frames at a distance one above the other into double welding heads of a horizontal four-head welding machine, the four-head welding machine having first and second carriages mounted so as to be movable relative to one another, each carriage supporting two double welding heads, clamping the sections in the double welding heads and welding the sections together in the double welding heads to form two welded window frames, moving support elements arranged at a slight distance from the first carriage and directed toward the second carriage from two opposite sides underneath each welded window frame, and, after at least partial cooling of the window frames and at least after moving the double welding heads of the first carriage apart from each other, laterally moving the window frames simultaneously and partially resting on the support elements by a movement of the second carriage out of the four-head welding machine and transferring the window frames to an intermediate station.

2. The method according to claim 1, comprising individually transferring the two welded window frames from the intermediate station to a horizontal welding bead trimming machine.

3. The method according to claim 1, comprising transferring the two welded window frames individually to a transport device arranged in front of a welding bead trimming machine.

4. The method according to claim 2, comprising vertically moving the window frames before transferring the window frames to the welding bead trimming machine.

5. The method according to claim 3, comprising vertically moving the window frames before transferring the window frames to the transport device.

6. The method according to claim 1, comprising moving the intermediate station between the four-head welding machine and at least one additional horizontal four-head welding machine comprising double welding heads.

7. An apparatus for manufacturing window frames from sections of plastic material, the apparatus comprising a horizontal four-head welding machine, the four-head welding machine comprising double welding heads and first and second carriages configured to be movable relative to one another, each carriage supporting two double welding heads, further comprising at least two support elements mounted at a slight distance from the first carriage and directed toward the second carriage and configured to be movable underneath each welded window frame, wherein the second carriage is mounted so as to be displaceable on guide means for laterally moving both window frames simultaneously and partially resting on the support elements out of the four-head welding machine.

8. The apparatus according to claim 7, wherein the support elements are selected from the group consisting of guide rails, rollers and brush-type rails.

9. The apparatus according to claim 7, further comprising an intermediate station mounted downstream of the first carriage.

10. The apparatus according to claim 9, wherein the intermediate station comprises a lifting table.

11. The apparatus according to claim 9, wherein the intermediate station comprises two conveyor belts mounted one above the other.

12. The apparatus according to claim 9, wherein the intermediate station is configured to be movable between the four-head welding machine and at least one additional horizontal four-head welding machine comprising double welding heads.

13. The apparatus according to claim 9, wherein the intermediate station comprises a movable table.

14. The apparatus according to claim 9, comprising guide rails mounted between the first carriage and the intermediate station.

15. The apparatus according to claim 14, wherein the guide rails are mounted on the double welding heads.

16. The apparatus according to claim 14, wherein the guide rails are mounted on the intermediate station.

17. The apparatus according to claim 14, wherein the guide rails are comprised of conveyor belts.

* * * * *